May 8, 1956  J. E. RUEDY  2,744,808
APPARATUS FOR EVAPORATING CHEMICALS
Filed Aug. 27, 1952
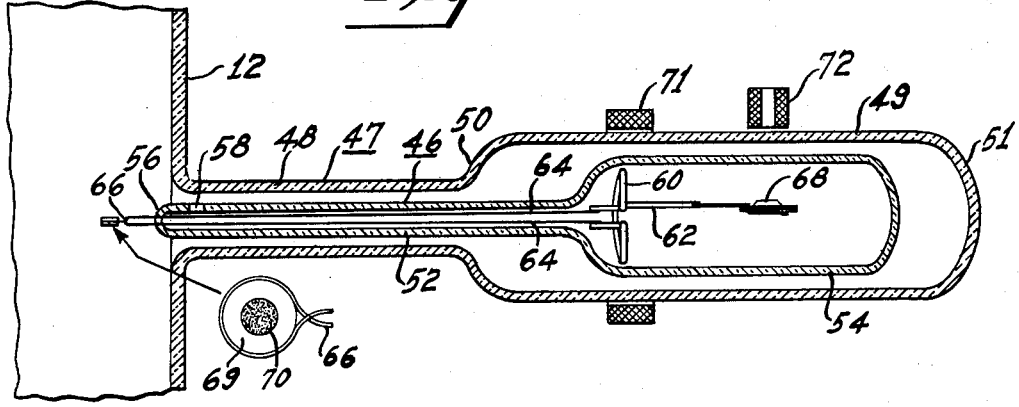
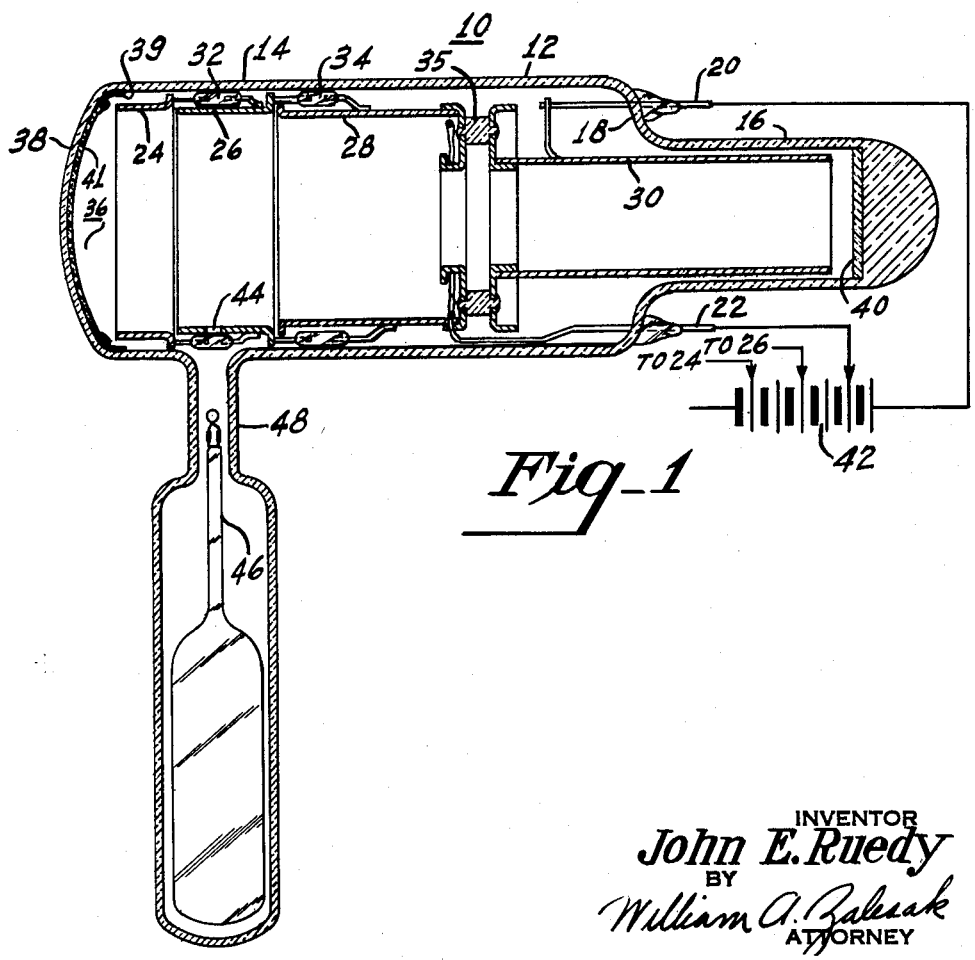
INVENTOR
John E. Ruedy
BY
William A. Balcsak
ATTORNEY United States Patent Office 2,744,808
Patented May 8, 1956

2,744,808

APPARATUS FOR EVAPORATING CHEMICALS

John E. Ruedy, Princeton, N. J., assignor to Radio Corporation of America, a corporation of Delaware Application August 27, 1952, Serial No. 306,601

7 Claims. (Cl. 316—30)

This invention relates to apparatus for use in chemical evaporation processes and particularly to apparatus for evaporating chemicals onto a predetermined area within a hollow container, more specifically a light sensitive screen of an image tube.

In the electronic arts, many devices such as camera pick-up tubes, phototubes and the like, utilize targets, photocathodes or other elements having films of photoelectric material which may be deposited by an evaporation process. Selenium, antimony, antimony trisulfide and caesium are typical examples of photoelectric materials which are often used in such applications.

In the preparation of such electron tubes, the tube and its components must be processed in conventional fashion by several operations including degassing. Degassing is generally accomplished by baking the tube envelope and the included components. To accomplish effective baking out, the process must be carried out at comparatively high temperatures on the order of 400° C. The tube processing procedure, however, is complicated by the fact that most photoelectric materials are sensitive to such high temperatures and are subject to deleterious changes if so heated. For example, the material, if in the form of a film on a target, may evaporate or transmute into an undesirable crystal structure. Thus the problem arises as to the proper method of preparation and the proper time during the processing of such an electron tube, to deposit the photoelectric material on the target. It is clear that coating the target, or photocathode or other element before processing the tube is undesirable because the target area, photocathode, or other elements could not then be properly treated, e. g. degassed and the like, without adversely affecting the photoelectric film or photolayer.

An alternative is to mount the tube components within the tube bulb, process the tube and its components completely and then evaporate the photoelectric material onto the target from suitably placed evaporators. This is the most desirable procedure and is effected by providing the electron tube envelope with a side tube or appendage which is used in the evaporation process. Some form of evaporator carrying the photoelectric material to be evaporated is inserted through the side tube and into the electron tube envelope so that the photoelectric chemical is in proper position to be evaporated onto the target.

Another problem concerns the disposition of the evaporator while the tube is being processed. In some instances, the evaporator is retained in retracted position within the side tube while only the tube proper and its components are processed. By this method of operation, gases present in the chemical charge or the evaporator or in the side tube itself may adversely affect the tube after it has been processed. Thus it is desirable to process, as by degassing and the like, the side tube and its contents at the same time as the tube itself is processed. If the latter procedure is employed and the photoelectric material has a vaporization temperature near that at which processing is effected, the chemical charge must be prepared and carried by the evaporator in such physical form that minimum evaporation occurs during processing.

Furthermore in some tubes, for example those tubes employing photoemissive films, two or more chemicals may be evaporated to form the photolayer. Such a photolayer may comprise a layer of antimony activated by caesium or the like. This creates another problem which requires a suitable evaporator for carrying two or more chemicals in the desired form to prevent evaporation of the chemical during tube processing. The evaporator must also be able to carry such chemicals so that the evaporator may be locally heated and each chemical may be selectively evaporated as desired.

Accordingly an important object of this invention is to provide a novel method and apparatus for preparing a photoelectric film on a predetermined surface area within a hollow container, more specifically the envelope of an electron discharge device.

Another object of this invention is to provide an improved method and apparatus for evaporating one or more chemical substances onto such surface area in an electron tube envelope.

A further object is to provide an improved evaporator for carrying one or more chemical materials to be evaporated onto a predetermined surface area within an electron tube envelope.

Another object is to provide an improved evaporator for carrying a plurality of chemical charges in isolated positions so that the charges may be heated and vaporized separately.

A further object is to provide an improved evaporator for carrying a chemical charge in such form that minimum undesired evaporation occurs.

A further object is to provide a method and apparatus for evaporating chemicals onto a predetermined area within an electron tube whereby optimum processing of the tube and evaporator may be effected without adversely affecting said chemicals.

In general the purposes and objects of the invention are achieved by the provision of a hollow support member which is supplied with a plurality of carriers of chemical material to be evaporated when each individual carrier is heated. One carrier comprises a conductive loop of heater wire which is projected out of the support member through one end thereof. The heater wires outside the hollow member are formed in a loop which is designed to carry a quantity of material to be evaporated, for example antimony. The material is evaporated by radio frequency induced heating of the heater wires. Within the member is a container adapted to carry another chemical such as an activator, e. g. a caesium compound or the like. This chemical is liberated from the container by high frequency induction heating of the container and passes out of the hollow member through an opening provided in the end thereof for that purpose. In an alternative arrangement, both chemicals may be carried within the hollow member.

The invention is described in detail with reference to the drawings wherein:

Fig. 1 is a diagrammatic longitudinal section of one form of electron device which may utilize this invention. The apparatus of the invention is also shown; and Fig. 2 is an enlarged longitudinal section of the apparatus of the invention shown in relation to a portion of the electron tube of Fig. 1.

The invention is described in detail with reference to an electron tube employing a target having a photoemissive film. Such an electron tube is shown and described in U. S. patent to Flory et al., 2,506,018. However the principles of the invention are applicable to the preparation of evaporated films in substantially any type of hollow container.

Referring to the drawing, the tube 10 includes an envelope or bulb 12 comprising two sections 14 and 16 of different diameters which are joined at their proximate ends by a conical flange 18. For convenience in manufacture and to obtain a mechanically strong structure a plurality of leads, of which the two leads 20, 22 appear in the drawing, are sealed into the conical flange. Anodes or focusing electrodes 24, 26, 28 and 30 of the tube 10 are mounted upon and carried by the leads in the flange 18 and are mechanically tied together into a rigid structure by a plurality of insulating beads or spacers 32, 34, and 35.

A photocathode 36 is formed on the transparent end wall or face plate 38 of the larger section 14 of the envelope 12 remote from the flange 18. The photocathode includes a conductive ring 39 of metal or the like formed around the periphery of the face plate 38 and a superposed layer 41 of photoelectric material such as caesiated antimony or the like. A fluorescent viewing screen or target 40 is placed at the end of the smaller section 16 remote from the annular flange 18.

The anode or focusing electrode 30, which is operated at the highest positive voltage of all the electrodes, is preferably within the smaller section 16 of the envelope 12 and extends beyond the annular flange 18 into the larger section 14. This construction facilitates the assembling of the anodes or focusing electrodes into a unitary mount on a stem consisting of the smaller section of the envelope with the annular flange 18, the edge of the annular flange then being sealed to the walls of the larger section of the envelope. By means of the leads in the conical flange 18, the photocathode 36 and the focusing electrodes may be electrically connected to a source of voltage, such as a battery 42, as shown in Figure 1.

For practicing the invention, the electrode 26 is provided with an opening 44 through which an evaporator 46 made according to this invention, may be inserted. The tube envelope 12 is provided with a side tubulation or appendage 47 through which the evaporator is inserted into the envelope. The side appendage comprises a narrow elongated portion 48 and an expanded portion 49 interconnected by a conical portion 50.

According to one suitable procedure for manufacturing the tube 10, the envelope is completely assembled with all of its components including electrodes 24, 26, 28, 30 and the image viewing screen 40. The face plate 38 is coated with the conductive ring 39 of a metal such as silver or the like. Because of the necessity for baking out the tube and components the photoelectric layer 41 is not deposited on the face plate 38 at this time.

After the aforementioned components are mounted in the envelope 12, the evaporator 46 is charged with the material to be evaporated and inserted into the side tubulation 47. The open end 51 of the tubulation is then sealed. The evaporator is retracted as far as possible in the side tubulation and the envelope and its included components are processed in conventional fashion.

In general, processing includes exhausting the envelope and degassing all components by a baking operation. Baking may be effected by any suitable means, for example, in a split oven which comprises two arcuate portions which are placed around the envelope 12. The tube is baked at approximately 350° C. to 400° C. for about one hour. Other processing steps may be included as required.

After the tube has been processed, the tube envelope 12 is tipped sufficiently so that the evaporator 46 is moved into the bulb into charge evaporating position. The correct charge evaporating position is automatically achieved by a portion of the evaporator bearing against and being stopped by the conical portion 50 of the side appendage 47. In this position of the evaporator, the portions thereof from which chemical is evaporated are substantially in the center of the bulb and in line with the face plate to be coated. The evapoartor is then heated and the chemical is evaporated onto the face plate 38. When the evaporation has been completed, the envelope is tipped again and the evaporator is withdrawn into the side appendage which is then sealed off. The tube is then processed to completion according to standard procedures. If desired, the evaporator may be provided with a slug of magnetic material for cooperating with an external magnet in moving the evaporator into and out of the envelope.

In Figure 2, is shown the evaporator 46 made according to the invention. The evaporator comprises a container made of glass or some other suitable nonconductor and includes an elongated tubular portion 52 and a closed expanded chamber 54 extending from one end thereof. The other end 56 of the elongated portion is closed and an opening 58 is provided therein near said end. An arrangement of conductor elements is provided in the evaporator for holding a quantity of material to be evaporated and for heating said material to evaporation temperature.

This conductor arrangement includes a loop 60 of conductive material, for example nickel wire, positioned in a plane perpendicular to the long axis of the expanded chamber 54. The loop of nickel wire is of a size which will not heat excessively during the evaporation process. An extended wire portion 62 of the same or similar material is connected to the loop of wire 60 and extends rearwardly therefrom. A pair of wires 64 made of tungsten or the like are also connected to the loop 60 and extend along the elongated portion 52 and through the end 56 where they are connected to another loop of wire 66 made of tungsten or the like. The wires 64 and 66 are designed to heat comparatively readily to a satisfactorily high temperature for evaporating the chemical material.

In one successful embodiment of my invention the nickel loop 60 was made of .050 inch wire. The tungsten wires 64 were made of .015 inch wire and the tungsten loop 66 was made of .01 inch wire.

A cup or capsule 68 made of conductive material, which may be metal or any other suitable substance capable of being inductively heated, is positioned within the expanded chamber 54 by means of the rearwardly extending wire connection 62 from the nickel loop 60. This method of connection is not critical and the cup 68 may be positioned within chamber 54 in any other suitable manner. The cup 68 is disposed remote from the loop 60 so that each may be heated separately without affecting the other if so desired. The cup 68 is also disposed with its long axis in a plane perpendicular to the plane of the loop 60. By this arrangement the cup 68 and the loop 60 may be separately heated by high frequency induction coils positioned at 90° with respect to each other.

In using the apparatus of the invention, a ceramic paste or other material suitable for forming a chemical-carrying matrix 69 is molded within the tungsten loop 66 and while still plastic a quantity of antimony 70, or other photoelectric material to be evaporated, is partially embedded therein. The ceramic matrix 69 is allowed to dry and solidify. The photoelectric material 70 is thus carried in a cup of ceramic and is free to evaporate in only one direction, that is out of the cup and toward the area to be coated. If desired the chemical might be fused directly on the wire loop 66. In this case the loop would be slightly altered to control the direction of evaporation of the chemical. A quantity of other material, for example an activator such as a caesium compound, which liberates caesium when heated, is deposited within the cup 68 in conventional fashion. By positioning the chemical bearing cup 68 within the evaporator 46, the chemical vapor which is liberated from the cup 68 upon heating thereof may be confined within the evaporator 46 so that the chemical vapor may thereafter be directed out of the opening 58 and onto the face plate 38. If desired, both chemicals may be carried within the evaporator itself.

After the evaporator 46, with its chemicals incorporated therein, is sealed within the side tubulation 47 and the tube is preliminarily processed, the evaporator is moved into the tube envelope 12 so that the forward end of the evaporator 46 bearing the chemical material 70 and the opening 58 are positioned centrally of the bulb 12 and directed towards the face plate 38, and the photoelectric layer 41 is formed by selective evaporation of the chemicals. To this end, a high frequency induction heating coil 71 is first positioned around the nickel loop 60, coaxially therewith, and electric currents are induced therein to promote heating of the tungsten wires 64. Such wires quickly heat to a temperature at which the chemical material 70 evaporates into the tube envelope 12 and onto the face plate 38. Since the cup 68 is mounted away from the nickel loop 60 and in a plane perpendicular thereto, the nickel loop 60 is inductively heated without the temperature of the cup 68 itself being seriously affected.

After the antimony or other first chemical 70 has been evaporated and deposited, the same or a similar high frequency heating coil 72 is positioned coaxially with the cup 68 to induce heating currents therein. The caesium or other activator within the cup 68 is evaporated thereby and passes from the chamber 54, along the interior of the elongated portion 52 and through the opening 58 into the bulb 12 and onto the coated face plate 38. Thereafter, heating of the nickel loop 60 evaporates whatever caesium may have condensed thereon, on the wires 64, and on the walls of the elongated portion 52.

When the evaporation process has been completed, the evaporator 46 is withdrawn from the tube envelope 12 and into the side tubulation 47 which is then sealed off at some convenient place close to the envelope 12. The tube is then processed to completion according to standard techniques.

What is claimed is:

1. Apparatus for use in evaporating chemical materials onto a predetermined area within a hollow evacuated container, said apparatus comprising; an insulating tubular support member having an opening at one end for discharging chemical vapor, a first chemical carrier disposed within said support member, said first carrier comprising a conductive circuit including a first loop of wire positioned within said tubular support member and a pair of wires connected to said first loop and extending along said tubular support member and terminating near said opening in a second wire loop adapted to hold a quantity of chemical to be evaporated, and a second chemical carrier positioned in said tubular support member and spaced from said first loop of wire of said first carrier, whereby heating currents may be selectively and inductively established in said first and second carriers to evaporate the chemicals to be carried thereby.

2. Apparatus for use in evaporating chemical materials onto a predetermined area within a hollow evacuated container, said apparatus comprising; an insulating tubular support member having an opening at one end for discharging chemical vapor, a first chemical carrier disposed within said support member, said first carrier comprising a conductive circuit including a first loop of wire positioned in a plane perpendicular to the axis of said tubular support member, said circuit including a pair of wires connected to said first loop and extending along said tubular support member and terminating near said opening in a second wire loop adapted to hold a quantity of chemicals to be evaporated, and a second chemical carrier positioned in said tubular support member in a plane parallel to the axis of said tubular support member, said second carrier being spaced from said first loop of wire of said first carrier, whereby heating currents may be selectively and inductively established in said first and second carriers to evaporate the chemicals to be carried thereby.

3. Apparatus for use in evaporating chemical materials onto a predetermined area within a hollow evacuated container, said apparatus comprising; an insulating tubular support member having an opening at one end for discharging chemical vapor, a first chemical carrier disposed within said support member, said first carrier comprising a conductive circuit including a first loop of wire positioned in a plane perpendicular to the axis of said tubular support member, said circuit including a pair of wires connected to said first loop and extending through said one end of said tubular support member and terminating in a second wire loop adapted to hold a quantity of chemical to be evaporated, and a second chemical carrier positioned in said tubular support member in a plane parallel to the axis of said tubular support member, said second carrier being spaced from said first loop of wire of said first carrier, whereby heating currents may be selectively and inductively established in said first and second carriers to evaporate the chemicals to be carried thereby.

4. Apparatus for use in evaporating chemical materials onto a predetermined area within a hollow evacuated container, said apparatus comprising; an insulating tubular support member having an opening at one end for discharging chemical vapor, a first chemical carrier disposed within said support member, said first carrier comprising a conductive circuit including a first loop of wire positioned in a plane perpendicular to the axis of said tubular support member, said circuit including a pair of wires connected to said first loop and extending through said one end of said tubular support member and terminating in a second wire loop, a first chemical carried by said second wire loop, a second chemical carrier positioned in said tubular support member in a plane parallel to the axis of said tubular support member, and a second chemical carried by said second chemical carrier, said second carrier being spaced from said first loop of wire of said first carrier, whereby heating currents may be selectively and inductively established in said first and second carriers to evaporate the chemicals carried thereby.

5. Apparatus for use in evaporating chemical materials onto a predetermined area within a hollow evacuated container, said apparatus comprising; an insulating tubular support member having an opening at one end for discharging chemical vapor, a vaporizable chemical supported within said support member near its other end, and filament means intermediate said opening and said chemical for heating the region therebetween.

6. Apparatus for use in evaporating chemical materials onto a predetermined area within a hollow evacuated container, said apparatus comprising; an insulating tubular support member having an elongated tubular portion at one end thereof and a bulbous tubular portion at the other end thereof, said elongated portion having an opening at one end for discharging chemical vapor, a first chemical carrier disposed within said support member, said first carrier comprising a conductive circuit including a first loop of wire positioned in said bulbous portion in a plane perpendicular to the axis of said tubular support member, said circuit including a pair of wires connected to said first loop and extending along said elongated tubular portion and extending through said one end of said elongated portion and terminating in a second wire loop adapted to hold a quantity of chemical to be evaporated, and a capsule chemical container positioned in said bulbous portion in a plane parallel to the axis of said tubular support member, said capsule being spaced from said first loop of wire of said first carrier whereby heating currents may be selectively and inductively established in said first carrier and said capsule to evaporate the chemicals carried thereby.

7. Apparatus for use in evaporating chemical materials onto a predetermined area within a hollow evacuated container, said apparatus comprising; a tubular guide member appended to said container, said guide member having a first elongated tubular portion at its attached end, a first bulbous portion at its free end, and an interconnecting first shoulder therebetween, an insulating tubular support member having a second elongated tubular portion at one end thereof, a second bulbous portion at the other end thereof, and a second interconnecting shoulder therebetween, said tubular support member being movable within said tubular guide member to permit entry and exit of said second elongated tubular portion with respect to said container, said entry being limited by abutment of said first and second shoulders, said second elongated tubular portion having an opening at one end for discharging chemical vapor, and a first and second chemical carrier supported by said tubular support member.

References Cited in the file of this patent

UNITED STATES PATENTS

| | | |
|---|---|---|
| 1,881,616 | Ives | Oct. 11, 1932 |
| 2,667,600 | Goff | Jan. 26, 1954 |